Oct. 10, 1950     L. J. MORAST     2,525,707
COMBINED TRAILER HITCH AND BUMPER GUARD
Filed June 13, 1945     2 Sheets-Sheet 1
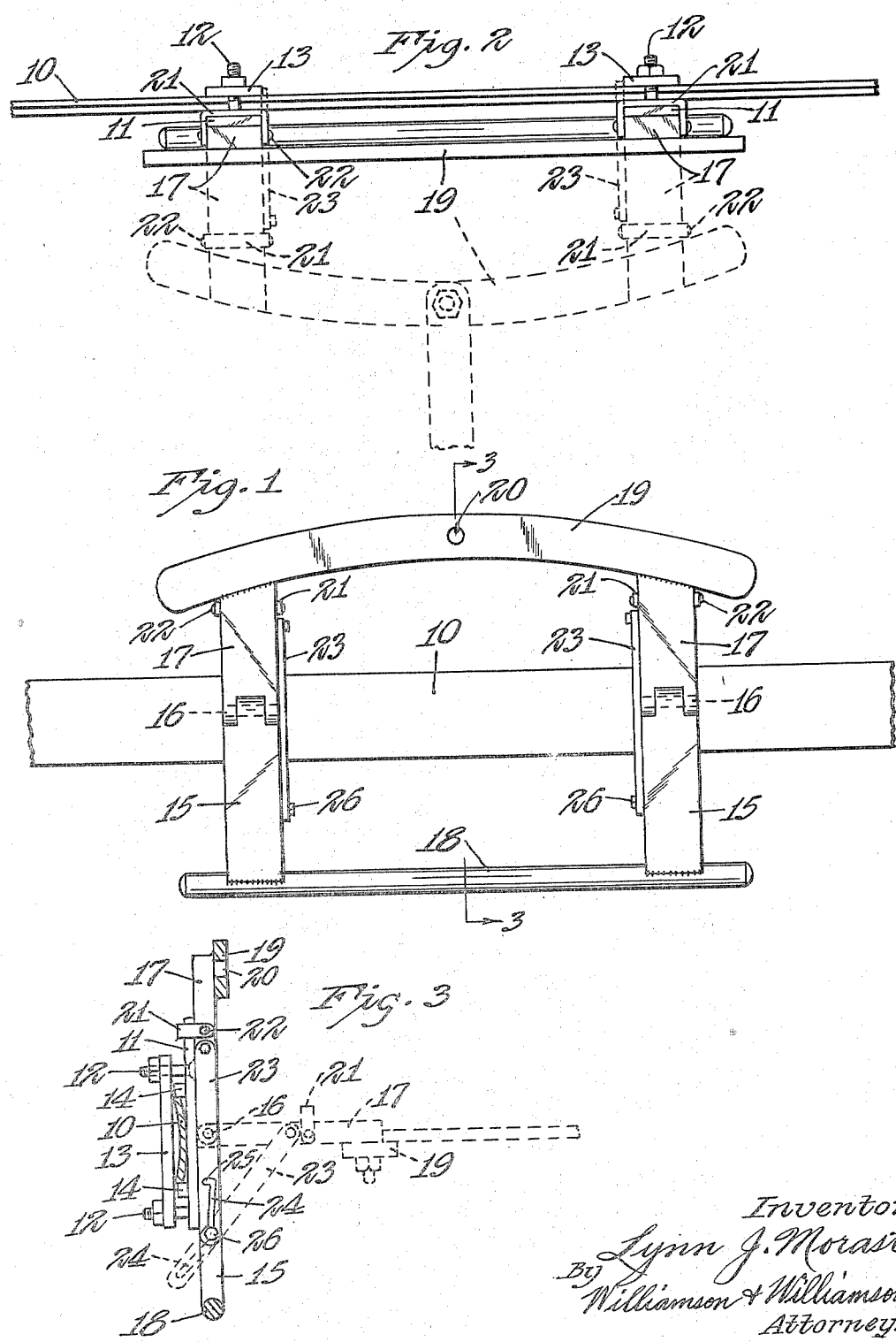
Inventor
Lynn J. Morast
By Williamson & Williamson
Attorneys

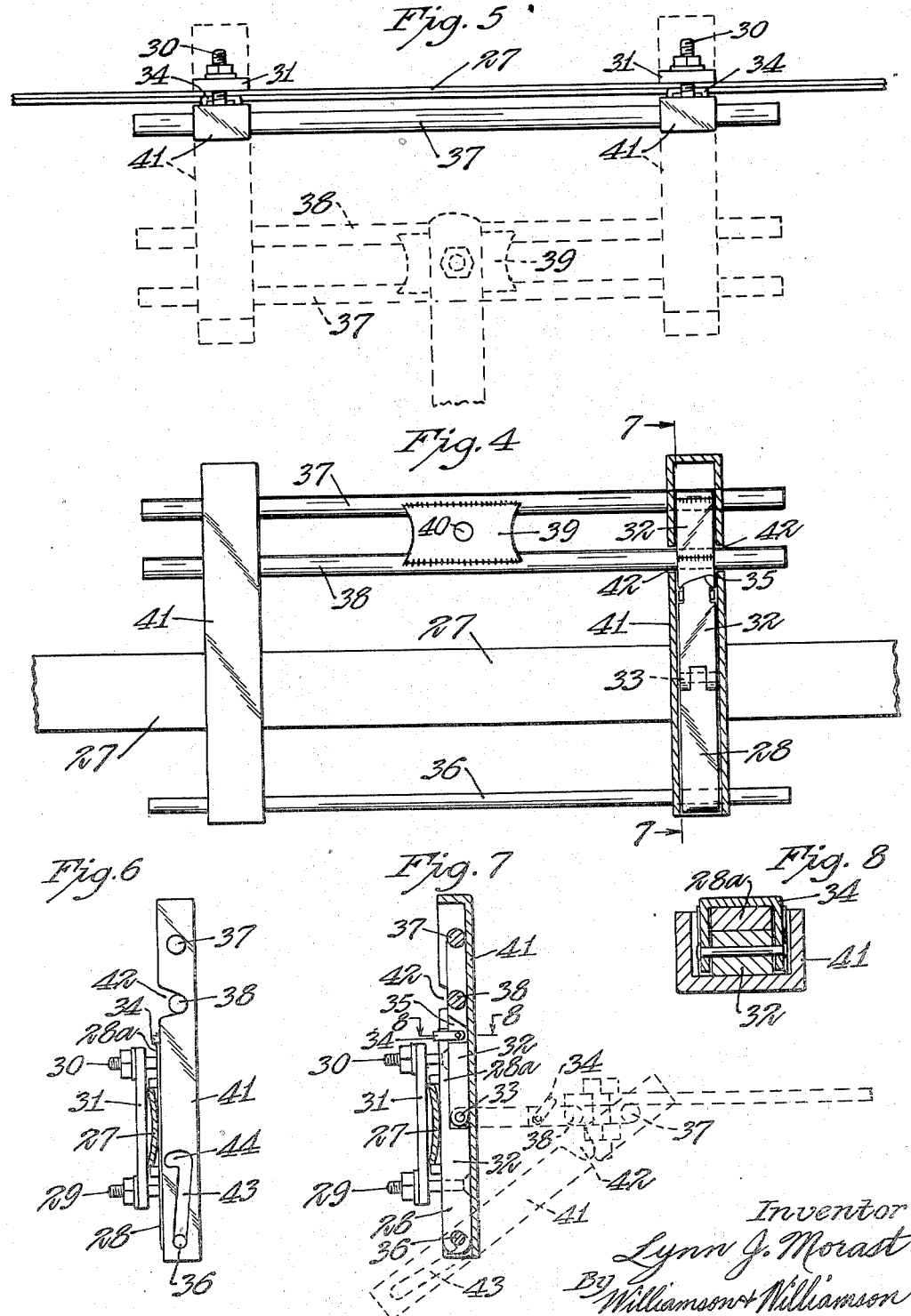

Patented Oct. 10, 1950

2,525,707

UNITED STATES PATENT OFFICE 2,525,707

COMBINED TRAILER HITCH AND BUMPER GUARD

Lynn J. Morast, Minneapolis, Minn.

Application June 13, 1945, Serial No. 599,242

2 Claims. (Cl. 280—33.44)

This invention relates to motor vehicle accessories and more particularly to devices which are adapted for use as weight supporting drawbar connections and which can be converted into bumper units when not being used as drawbar members and the like.

More specifically it is an object of the invention to provide a device capable of attachment to a motor vehicle on the rear bumper or a similar structural cross member, wherein said device, in one position thereof, presents an appreciable substantially vertical contact surface and wherein a portion of the device can be shifted upwardly and will extend rearwardly and wherein it is supported in such rearwardly extending position in a manner which will support considerable weight that it constitutes an effective drawbar connection, trailer hitch and the like.

The above and other objects and advantages of the invention will more fully appear from the following description made in connection with the accompanying drawings, wherein like reference characters refer to the same parts throughout the views, and, in which:

Figure 1 is a rear elevational view of the embodiment of the invention showing a portion of a vehicle bumper;

Figure 2 is a top plan view taken approximately on the line 2—2 of Figure 1 and showing a portion of the device in an alternate position;

Figure 3 is a vertical sectional view taken approximately on the line 3—3 of Figure 1;

Figure 4 is a rear elevational view of another embodiment of the invention showing a portion of a vehicle bumper and also showing a portion of the device in section;

Figure 5 is a top view of the device showing an alternate position thereof in dotted lines;

Figure 6 is an end elevation of the device of Figure 4;

Figure 7 is a vertical sectional view taken approximately on the line 7—7 of Figure 4 and showing an alternate position of the device in dotted lines; and Figure 8 is an enlarged fragmentary sectional view taken approximately on the line 8—8 of Figure 7.

In Figures 1 through 3 there is shown a portion of a motor vehicle bumper 10. A pair of vertical plates 11 lie on the outer or rear side of the bumper 10. Extending forwardly through the plates 11 are bolts 12 which extend through clamping plates 13 at the inner or forward side of the bumper 10 in spaced relation as best shown in Figure 3. It is preferred that the plates 11 be equipped with lugs 14 shown in Figure 3 which facilitate the clamping of said plates 11 with different types and shapes of motor vehicle bumpers.

Welded or otherwise suitably secured to the lower portion of the vertical plates 11 are vertical members 15. The upper ends of the members 15 are pivotally connected by pintles 16 to members 17 which in their vertical positions form substantial continuations of the lower vertical members 15. Said lower members 15 are connected by a bar 18 and the upper members 17 are connected by a bar 19 having a central aperture 20 adapted to receive a trailer hitch pin or bolt as shown in dotted lines in Figures 2 and 3.

As best shown in Figure 3, the upper pivoted members 17 are held in a vertical position by means of U-shaped fasteners 21 which are pivotally connected to the members 17 as at 22 and which are adapted to swing over the upper ends of the vertical plates 11 which extend a considerable distance above the pintles 16 which connect the members 15 and 17. When the fasteners 21 are swung upwardly above the ends of the vertical plates 11 the members 17 and their upper connecting bar 19 can be swung rearwardly and downwardly.

Pivotally connected to each of the hinged members 17 is a brace 23. The lower portion of each brace 23 is provided with a generally vertical slot 24, the upper end of which is offset as at 25. Bolts 26 extend through the slots 24 and are mounted in the lower vertical members 15. The relative positions of the parts are such that when the upper hinged members 17 are swung to their vertical full line positions shown in Figure 3, the bolts 26 will lie approximately at the bottoms of the slots 24 in the braces 23, and when the upper hinged members 17 and their connecting cross member 19 are swung rearwardly and downwardly to the dotted line position of Figure 3 the bolts 26 will rest in the offset portions 25 of said slots 24.

When the device is in the full line positions of Figures 1 and 3 it serves as what is commonly termed a bumper guard. Portions of its structure extend above and below the bumper 10 and for that reason prevent the bumpers of other vehicles from riding over or under the bumper 10, a condition which frequently occurs when motor vehicles are being parked at the curb and in other parking areas. When the upper portion comprising the members 17 and their connecting bar 19 are swung downwardly to the dotted line positions of Figures 2 and 3 and supported by the braces 23, the device serves as a trailer hitch unit. It is possible to connect a trailer to the cross bar 19 to provide a sturdy and efficient trailer hitch unit. By reason of the support given by the braces 23 it is possible to connect a two wheeled trailer because the cross bar 19 is adequately supported and constitutes a weight bearing member.

The embodiment shown in Figures 4 through 8 is constructed along the same general principles as that of Figures 1 through 3 with some modifications in detail.

In Figures 4 through 7 there is shown a vehicle bumper 27. There is also shown a pair of vertical members 28 which have relatively thin upper portions 28a. Vertically spaced bolts 29 and 30 extend respectively from the members 28 and their upper extensions 28a, and said bolts extend through clamping plates 31 similar to the clamping plates 13 shown in the first described embodiment.

Upper vertical members 32 are connected to the upper ends of the thicker lower portions 28 of the lower vertical members by means of pintles 33, said upper members 32 extending above the upward extensions 28a of said lower vertical members. Substantially U-shaped fastening elements 34 are shown in Figure 7 pivotally connected to the upper vertical members 32 and they are so positioned that they can be swung downwardly over the upper ends of said extensions 28a of the lower vertical members 28. The fastening elements 34 have the ends of their side portions positioned in countersunk cut-outs 35 in the sides of the upper vertical members 32 so that said fastening members 34 are within the lateral confines of said members 32.

The lower vertical members 28 are connected at their lower ends by a cross bar 36 and the upper vertical members 32 are connected by spaced cross bars 37 and 38. Extending between said bars 37 and 38 at their medial portions is a trailer connector plate 39 having a hitch pin aperture 40.

Lying about the sides and rear faces of the vertical members 28 and 32 are braces 41 which more or less encase said vertical members 28 and 32. Said braces 41 pivotally receive the end portions of the upper cross bar 37 and notches 42 are adapted to receive the cross bar 38 which lies closely beneath the upper cross bar 37. The lower side portions of the braces 41 are provided with slots 43 having upper offset portions 44. The lower cross bar 36 extends through the slots 43. The connection of the braces 41 with the upper cross bar 37 and lower cross bar 36 thereby provides means whereby the upper structure of the device can be swung to a rearward and generally horizontal position such as indicated in Figures 5 and 7.

The function of the device shown in Figures 5 through 8 is essentially the same as that shown in Figures 1 through 3, but in the second embodiment it will be seen that the braces 41 provide more or less of an enclosure for the hinged vertical members 28 and 32 and thereby produce an article which is very neat in appearance when the device is in the full line positions of Figures 5 through 7.

It will, of course, be understood that various changes may be made in the form, details, arrangement and proportions of the various parts without departing from the scope of my invention.

What I claim is:

1. A folding hitch for use on the bumper of a motor vehicle comprising a set of spaced vertical arms extending substantially below said bumper and having their upper portions rigidly fixed to the outer side of said bumper, a connecting bar extending between the lower portions of said arms, said arms and said bar co-operating to form a bumper guard extending below said bumper, a second set of spaced arms each having one of their ends pivotally connected to the upper portion of one arm of said first mentioned set of arms so as to be capable of swinging rearwardly from a vertical to a horizontal position, a yoke bar transversely connecting the other ends of said second set of arms, said ends and said yoke bar extending substantially above said bumper and co-operating to form a bumper guard above said bumper when in vertical position, means carried by the central portion of said yoke bar, for hitching a trailer thereto when said yoke bar is swung to a horizontal position, and connection means between said second set of arms including a support for holding said second set of arms in their rearwardly disposed position.

2. A folding hitch for use on the bumper of a motor vehicle comprising a set of spaced vertical arms extending substantially below said bumper and having their upper portions rigidly fixed to the longitudinally medial portion of the outer side of said bumper, a connecting bar extending between the lower portions of said arms, said arms and said bar co-operating to form a bumper guard extending below said bumper, a second set of spaced arms each having one of their ends pivotally connected to the upper portion of one arm of said first mentioned set of arms so as to be capable of swinging rearwardly from a vertical to a horizontal position, a yoke bar transversely connecting the other ends of said second set of arms, said ends and said yoke bar extending substantially above said bumper and co-operating to form a bumper guard above said bumper when in vertical position, means carried by the central portion of said yoke bar for hitching a trailer thereto when said yoke bar is swung to a horizontal position, mechanism for holding said second set of arms in a vertical position, and connection means between said second set of arms including a support for holding said second set of arms in their rearwardly disposed position.

LYNN J. MORAST.

REFERENCES CITED

The following references are of record in the file of this patent:

UNITED STATES PATENTS

| Number | Name | Date |
|--------|------|------|
| 1,977,734 | Monckmeier | Oct. 23, 1934 |
| 2,179,070 | Weise | Nov. 7, 1939 |
| 2,206,444 | Beckwith | July 2, 1940 |
| 2,230,516 | Radtke | Feb. 4, 1941 |
| 2,273,131 | Monckmeier | Feb. 17, 1942 |
| 2,283,436 | Hawkins, Sr. | May 19, 1942 |
| 2,399,810 | Ketcham | May 7, 1946 |